US006142593A

United States Patent [19]
Kim et al.

[11] Patent Number: 6,142,593
[45] Date of Patent: Nov. 7, 2000

[54] DOCKING STATION WITH ADJUSTABLE GUIDE RAILS

[75] Inventors: Tae-Yong Kim; Phil-Kyu Choi, both of Suwon, Rep. of Korea

[73] Assignee: SamSung Electronics Co., Ltd., Suwon, Rep. of Korea

[21] Appl. No.: 09/066,539

[22] Filed: Apr. 27, 1998

[30] Foreign Application Priority Data

Apr. 25, 1997 [KR] Rep. of Korea ...................... 97-15540
Dec. 9, 1997 [KR] Rep. of Korea ...................... 97-67157

[51] Int. Cl.[7] .................................................... A47B 81/06
[52] U.S. Cl. ........................................ 312/223.2; 361/686
[58] Field of Search ................................ 312/201, 208.4, 312/223.1, 223.2, 223.3; 361/681, 683, 686; 248/923

[56] References Cited

U.S. PATENT DOCUMENTS

| | | | |
|---|---|---|---|
| 5,196,993 | 3/1993 | Herron et al. | 248/923 |
| 5,450,271 | 9/1995 | Fukushima et al. | 361/686 |
| 5,497,296 | 3/1996 | Satou et al. | 361/681 |
| 5,504,648 | 4/1996 | Honda et al. | 361/686 |
| 5,535,093 | 7/1996 | Noguchi et al. . | |
| 5,552,959 | 9/1996 | Penniman et al. . | |
| 5,555,491 | 9/1996 | Tao | 361/686 |
| 5,694,292 | 12/1997 | Paulsel et al. . | |
| 5,699,226 | 12/1997 | Cavello . | |
| 5,768,101 | 6/1998 | Cheng | 361/686 |
| 5,864,294 | 1/1999 | Hsu et al. | 361/686 |
| 5,882,220 | 3/1999 | Horii et al. | 361/683 |

*Primary Examiner*—Peter M. Cuomo
*Assistant Examiner*—Jerry A. Anderson
*Attorney, Agent, or Firm*—Robert E. Bushnell, Esq.

[57] ABSTRACT

A portable computer docking station provided with adjustable guide rails. The guiding device effectively guides various portable computers on the docking station irrespective of different widths or differently positioned computer ports. Thus, the present invention allows users to buy a docking station regardless of the types of portable computers that will be interfaced with the docking station. The present invention also allows a user to use an existing docking station when the user changes a currently used portable computer for a new one. The invention further allows computer manufacturers to disregard specifically designing docking stations every time a new portable computer is developed.

39 Claims, 15 Drawing Sheets

10
12
100
110
104
110
101

10
12
30
31
32
34
40

10
12
30
32
31
34
40
42
43
44
46
50
52
54
56

60'
64
86
61'
70
70'
10
12

100
110
104
110
101
10
12

DOCKING STATION WITH ADJUSTABLE GUIDE RAILS

CLAIM OF PRIORITY

This application makes reference to, incorporates the same herein, and claims all rights accruing thereto under 35 U.S.C. §119 through my patent application entitled *Portable Computer Expansion System With Adjustable Guiding Device* earlier filed in the Korean Industrial Property Office on the 25th day of April 1997 and there duly assigned Ser. No. 1997/15540.

BACKGROUND OF THE INVENTION

1. Field of the Invention

The present invention relates to docking stations and, more specifically, to the guide rails used with a docking station to simplify the interfacing of a portable computer with a docking station.

2. Background Art

The ease of traveling with portable computers, e.g. portable computers, has been one of the factors in their increasing popularity. A portable computer is often constructed with a liquid crystal display handedly attached to the main body of the computer. The display panel also forms a cover for the keyboard, that is built onto the main body. Various ports are located along the rear side of the main body for attaching various input or output devices. However, the amount of time necessary to connect and disconnect a portable computer from peripheral devices is often inconvenient when a user is in a rush. To simplify the connection of portable computer computers to peripheral devices, a docking station is used to allow the portable computer to quickly connect and disconnect to a host of peripheral devices. The connection between the portable computer and the docking station is important for the effective use of the portable computer.

One problem with typical docking stations is that they are designed to only operate with one type of portable computer. Thus, preventing owners of multiple portable computers from easily connecting to the same set of external peripheral devices. In response to this problem docking stations have been developed that allow various types of portable computers to interface with the same docking station. Different techniques for connecting one docking station to various portable computers are shown, for example, in U.S. Pat. No. 5,699,226 to Cavello entitled *Computer Docking Station Having Interchangeable Receivers Configured for Docking Various Sized Portable Computers,* U.S. Pat. No. 5,535,093 to Noguchi entitled *Portable Computer Docking Device Having a First Rotatable Connector and a Second Connector,* U.S. Pat. No. 5,552,959 to Penniman entitled *Notebook Computer Docking Station Having Floating Connector Interface Structure,* and U.S. Pat. No. 5,694,292 to Paulsel entitled *Portable Computer Docking Station with Removable Support Shelf Apparatus.* The docking stations provided by the contemporary art do not offer an apparatus for interfacing a portable computer with a docking station that has a simple design, that is easy to assemble by non-technical workers, that has few component parts, that allows multiple types of portable computers to interface with one docking station, and that is easy for a user to adjust.

As such, I believe it may be possible to improve on the contemporary art by providing a docking station that can interface with a variety of portable computers, that has a simplified design, that is easy to assemble for non-technical workers, that has few component parts, and that is easy for a user to adjust when switching the type of laptop being interfaced with the docking station.

SUMMARY OF THE INVENTION

Accordingly, it is an object of the present invention to provide an improved docking station that can accommodate portable computers of various widths.

It is another object to provide a docking station that uses a simplified design to allow the docking station to interface with various portable computers.

It is still another object to provide a docking station that uses few additional parts to enable the docking station to interface with various types of portable computers.

It is yet another object to provide a docking station that is easy for users to adjust when switching the type portable computer being interfaced with the docking station.

To accomplish these and other objects, a docking station having adjustable guide rails is provided. The docking station has a chassis that has a tray portion that supports the portable computer when it is interfaced with the docking station. One embodiment of the docking station having adjustable guide rails uses a seating surface, that is recessed into the tray portion of the docking station, to attach the guide rail to the docking station. The guide has a rectangular body with an attached flange that serves as a guide rail for the portable computer. Viewed from the side the guide rail has an L-shape. On the bottom of the guide rail body is a plug that interfaces with a first groove in the seating surface and a pair of opposing latches that slidably engage a second groove in the seating surface. The first groove has sides with a wavy shape forming multiple necked segments along the length of the first groove that secure the plug of the guide rail into place. The guide rail is located on one lateral side of the tray portion of the docking station. On the other side of the tray portion of the docking station either a second flange, that would function as a fixed guide rail, or a second seating surface and guide rail may be located.

A second embodiment of a portable computer with moveable guide rails uses a guide rail that has ridges on a bottom surface that engage with slits in the seating surface on the tray portion of the portable computer. Additionally, the guide rail has a counterbore hollow through which a fastener can be inserted. The fastener is inserted through the guide rail and through a slot that is located in the seating surface and protrudes through the groove and into a spring biasing member. The member is a body that has a bore that is also penetrated by the fastener. Then a compressed spring is placed over the fastener and a cap is put on the end of the fastener. The spring exerts a force securing the guide rail to the chassis of the docking station. The combination of the force generated by the spring and the engagement of the ridges on the bottom of the guide rail with the slits on the chassis, secures the guide rail in place while allowing a user to easily adjust the guide rail. This embodiment of the guide rail can be used in a recess along with a fixed guide rail or it can be used with two opposing guide rails recessed into the tray portion of the guide rail. Additionally, when two or more adjustable guide rails are used the seating surface on the chassis does not need to be recessed. When the guide rails are not recessed into the computer, they support the portable computer above the tray portion of the chassis. The elevation of the portable computer above the chassis of the docking station allows for air to flow underneath the portable computer and cool the computer.

A third embodiment of the present invention uses a simplified seating surface consisting of one groove. The guide rail of the third embodiment has a counterbored hollow and is fastened to the chassis. To adjust the position of the guide rail a user must loosen the fastener and adjust the position of the guide rail and then tighten the guide rail securely against the chassis of the computer. As with the second embodiment the guide rail of the third embodiment can be recessed for use with one fixed guide rail or two or more guide rails of the third embodiment can be used and not recessed into the tray portion of the chassis.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 13A is a cross-sectional view of the guide rail of FIG. 9 illustrating the position of the guide rail when a user lifts it from the seating surface prior to adjustment;

FIG. 13B is a cross-sectional view of the guide rail of FIG. 13A, illustrating the guide rail of FIG. 13A adjusted to a new position over the seating surface;

FIG. 13C is a cross-sectional view of the guide rail of FIG. 13B after a user has released the guide rail, allowing the spring to bring the ridges of the guide rail into engagement with the slits in the seating surface to secure the guide rail to the chassis;

FIG. 16A illustrates the guide rail of FIG. 14 with the fastener loosened to allow the adjustment of the guide rail;

FIG. 16B illustrates the guide rail of FIG. 14 with a fastener tightened to secure the guide rail in position against the chassis.

DETAILED DESCRIPTION OF THE DRAWINGS

Figure 1:
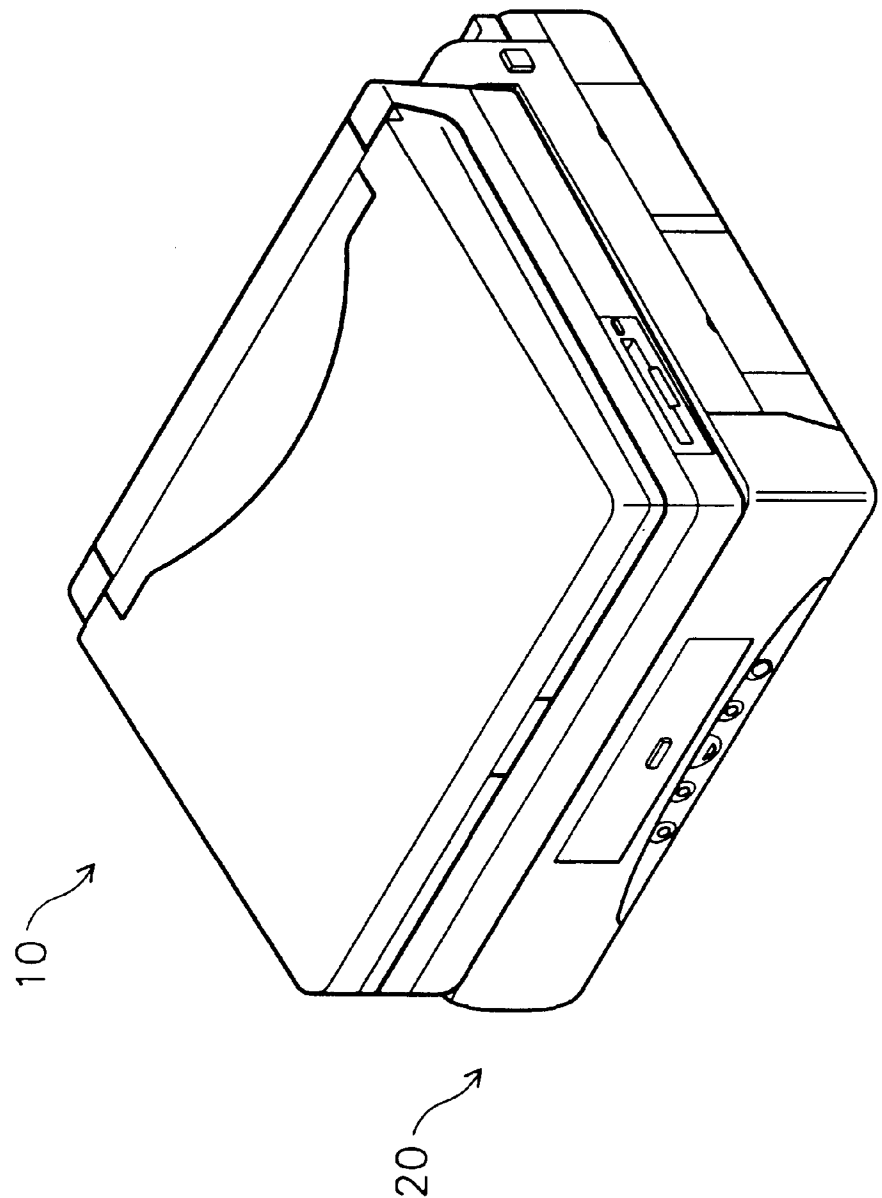
FIG. 1 is a perspective view of a portable computer attached to a docking station.

Turning now to the drawings, FIG. 1 illustrates portable computer 10 interfaced with docking station 20. The guide rails of the present invention effectively guide a portable computer into position for interface with a docking station, irrespective of the width of the portable computer or the position of the port on the portable computer. FIGS. 2 through 17 show various embodiments of the guide rails as constructed according to the various embodiments of the present invention.

Figure 2:
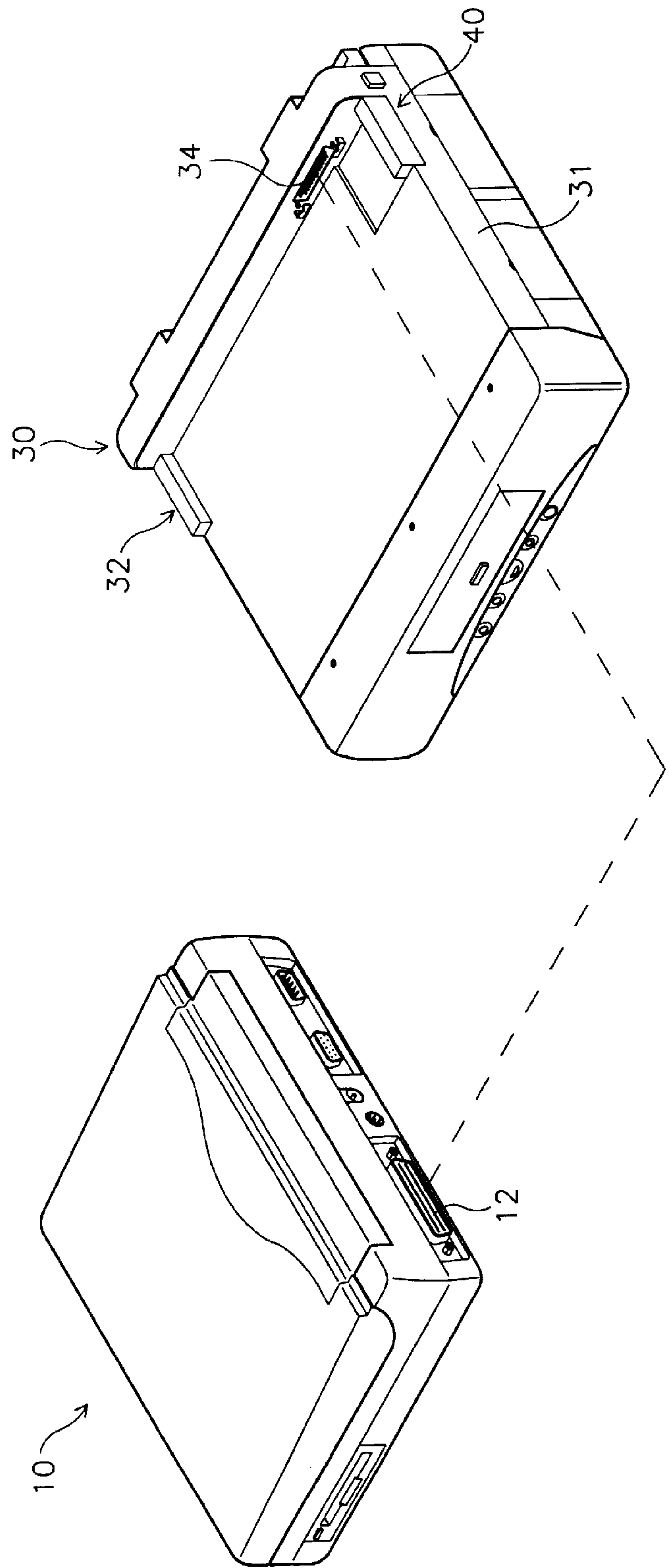
FIG. 2 is a perspective view of a docking station as constructed according to the first embodiment of the present invention, illustrating the combination of an adjustable guide rail and a fixed guide rail along with the proper positioning of a portable computer.

FIG. 2 illustrates portable computer 10 and docking station 30 with a guide rail as constructed according to the primary embodiment of the present invention. The docking station may be constructed using at least one guide rail 40 and one fixed guide rail 32. That is, guide rail 40 may be slidably installed on either side of the tray portion of housing 31. The tray portion of the docking station supports the portable computer while the computer is interfaces with the docking station. Fixed guide rail 32 is positioned opposite from guide rail 40 and acts in cooperation with guide rail 40 to properly align the portable computer while it is interfacing with the docking station.

Figure 3:
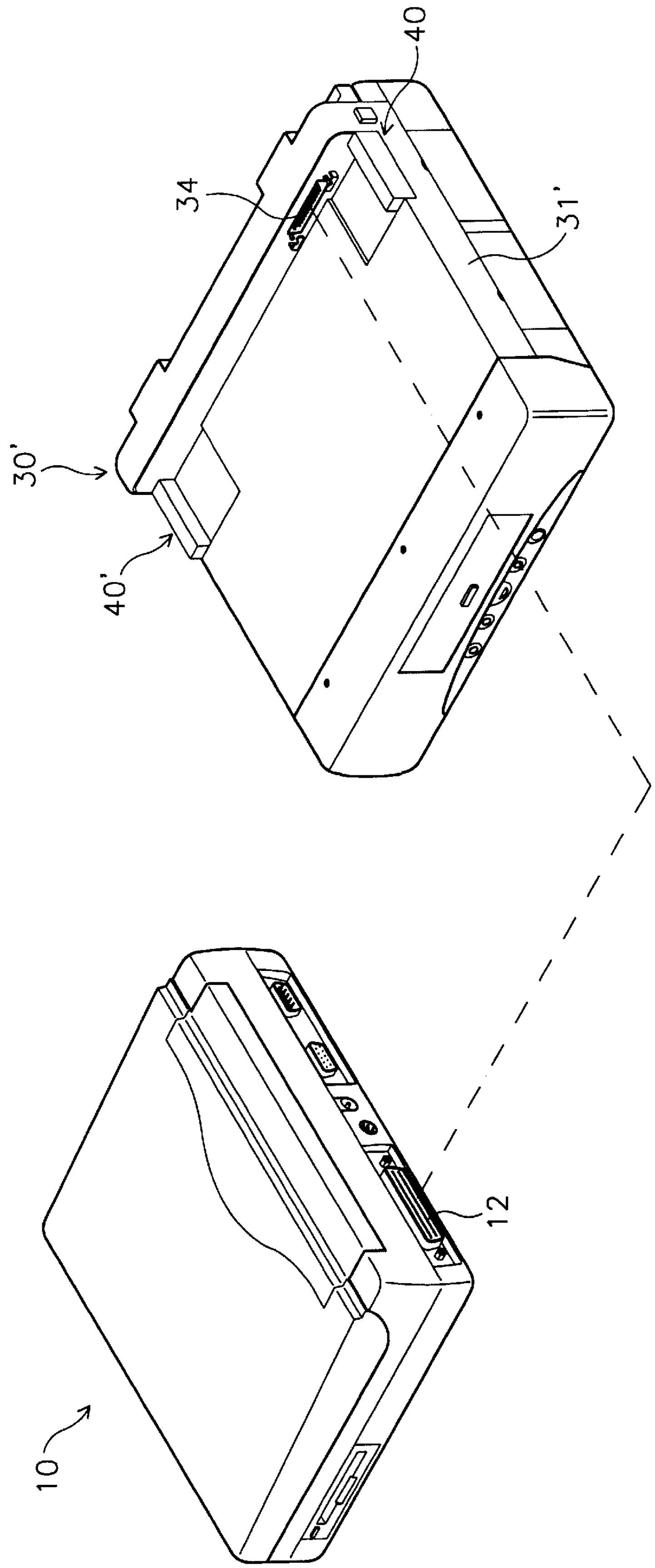
FIG. 3 is a perspective view of a docking station as constructed according to the first embodiment of the present invention with two adjustable guide rails.
Figure 4:
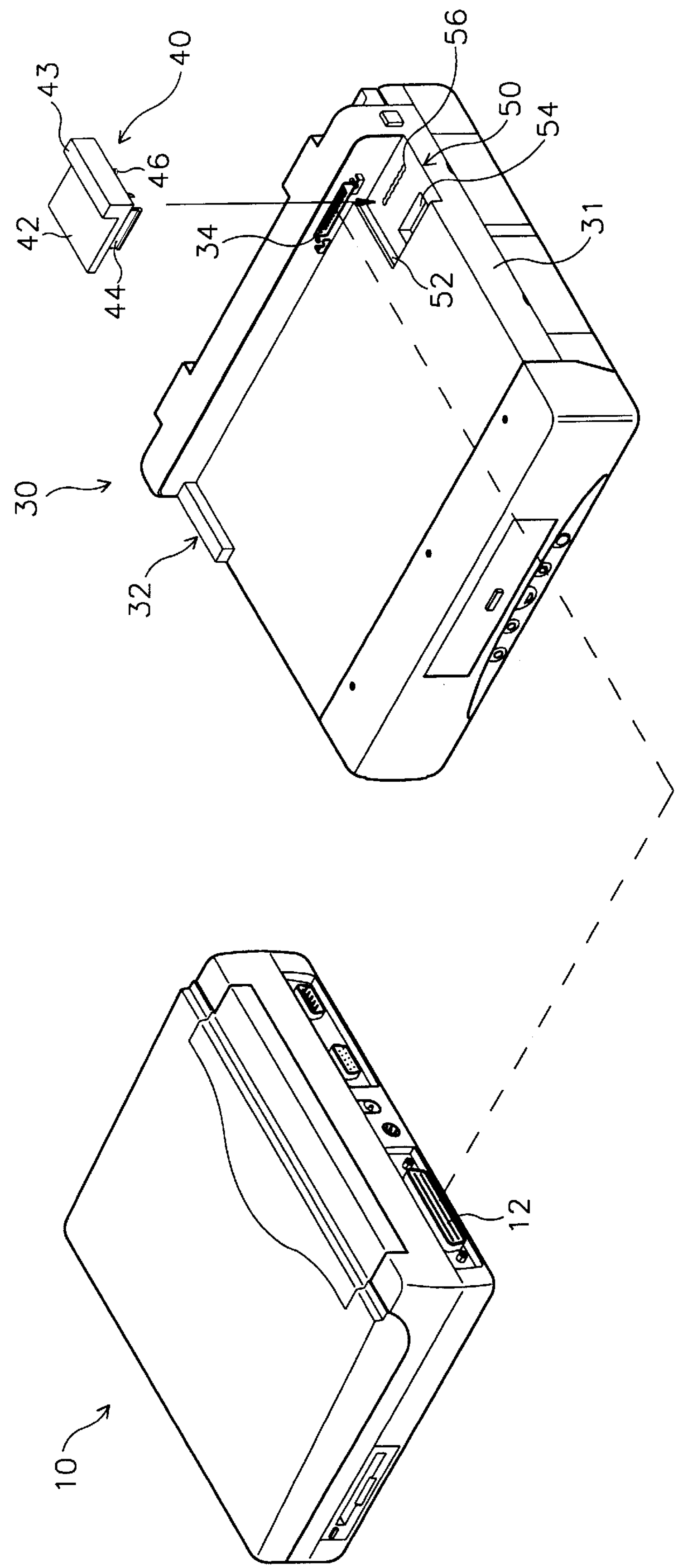
FIG. 4 is a perspective view of the docking station of FIG. 2 illustrating a guide rail separated from the recessed seating surface formed in the tray portion of the docking station.

Docking station 30' is shown in FIG. 3 with tho guide rails oppositely positioned to properly align portable computers of different widths. Thus, enabling computer port 12 to engage docking station port 34. Both of the guide rails are recessed into the tray portion of the chassis of the docking station. A seating surface for guide rail 40 is shown in FIG. 4. Seating surface 50 is recessed in depression 52. Guide rail 40 has pair of opposing latches 44 that slidably engage first groove 54 in the seating surface. Additionally, plug 46 engages second groove 56 in the seating surface. Guide rail 40 has flange 43 that functions as a guide rail and is secured to a rectangular shaped body that has top side 42.

Figure 5:
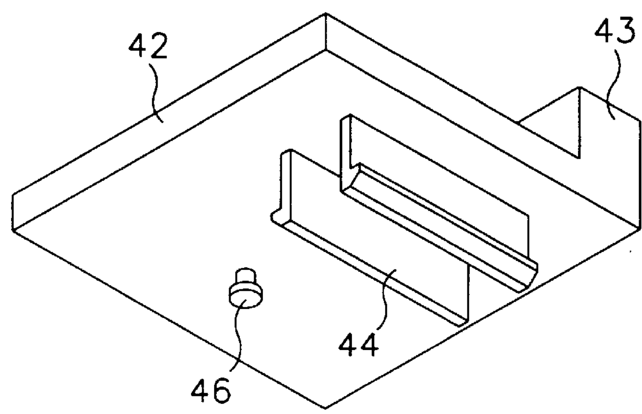
FIG. 5 is a bottom perspective view of guide rail of FIG. 2.
Figure 6:
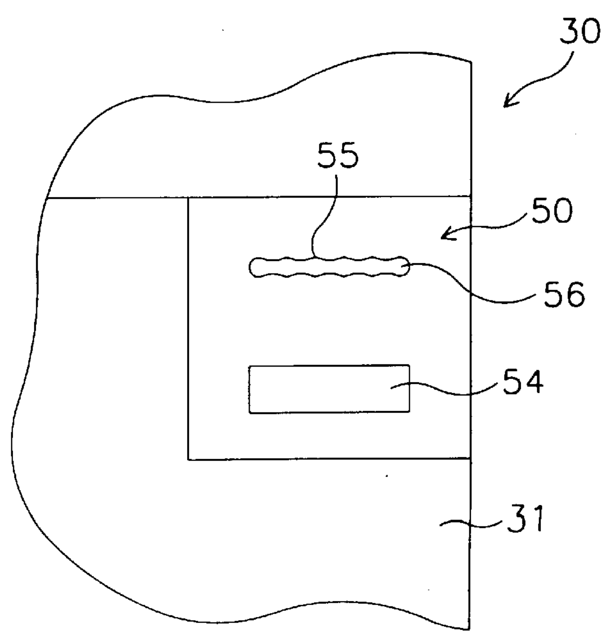
FIG. 6 is a plan view of the seating surface used in conjunction with the guide rail of FIG. 5.

A bottom view of guide rail 40 is shown in FIG. 5. Guide rail 40 may be constructed using rectangular body 42 and flange 43 that combine to produce an L-shaped member. On the base of the guide rail is pair of opposing latches 44 and plug 46. Both the plug and the pair of opposing latches attach to the seating surface shown in FIG. 6. Plug 46 engages second groove 56 and pair of opposing latches 44 engages first groove 54. Second groove 56 has wavy sides that form repeated necking segments 55.

Figure 7:
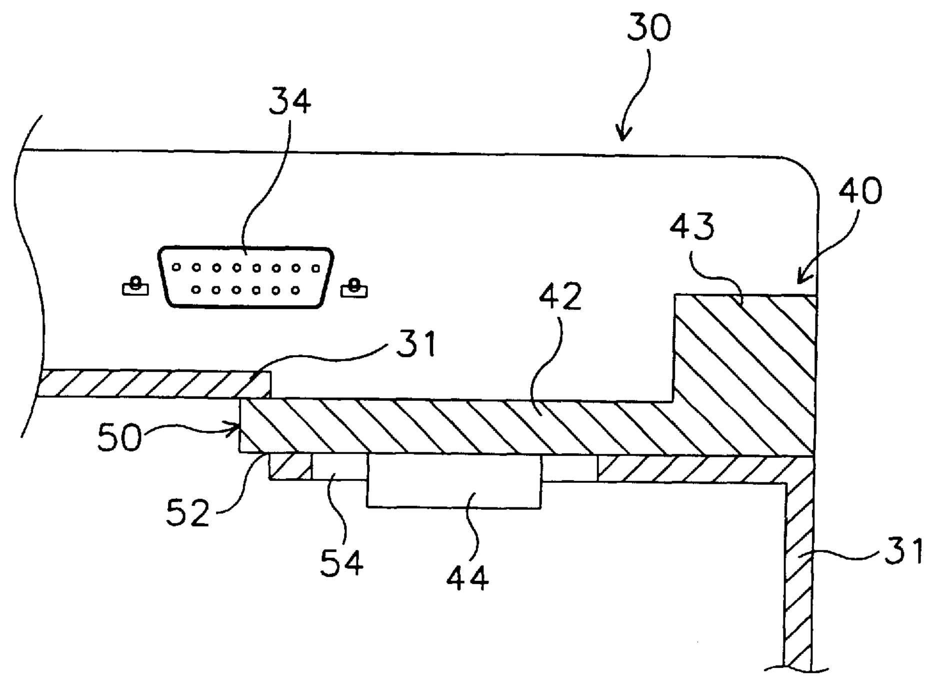
FIG. 7 is a cross-sectional view of the guide rail of FIG. 2 taken along the direction of sliding of the guide rail.
Figure 8:
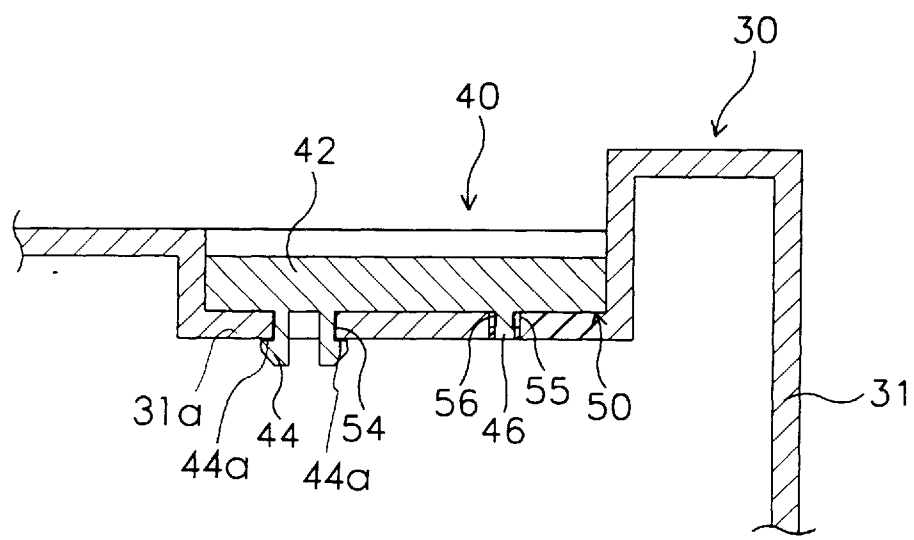
FIG. 8 is a cross-sectional view of the guide rail of FIG. 2 taken along a direction perpendicular to the direction of sliding of the guide rail.

FIG. 7 illustrates a cross-section view of guide rail 40 taken along the direction of sliding for guide rail 40. Pair of opposing latches 44 are slidably engaged with first groove 54 and rectangular body 42 is recessed so as not to protrude over the top side of chassis 31. FIG. 8 shows a cross-sectional view of guide rail 40 as taken along a direction perpendicular to the direction of sliding of the guide rail. Pair of opposing latches 44 is engaged with first groove 54 and plug 46 is engaged with second groove 56. Guide rail 40 is seated on seating surface 50 of docking station 30 as shown in FIG. 7. When a portable computer, that is to be installed on docking station 30, has a small width or port 12 is positioned in a misaligned fashion with the docking station's port 34, it is necessary to manually move guide rail 40 to the appropriate position to properly align the ports on both the portable computer and the docking station.

When the position of guide rail 40 on docking station 30 is adjusted, guide rail 40 stably slides on seating surface 50 due to pair of opposing latches 44 engaging with first groove 54. When guide rail 40 is engaged with seating surface 50, surface 44*a* of pair of latches 44 is in contact with bottom surface 31*a* of chassis 31. In addition, when the movable guide rail 40 reaches a desired position on seating surface 50, plug 46 of guide rail 40 is held in guide rail holding area 55 of second groove 56 while generating a clicking sound. The adjusted position of guide rail 40 is maintained until a user re-adjusts guide rail 40.

Figure 9:
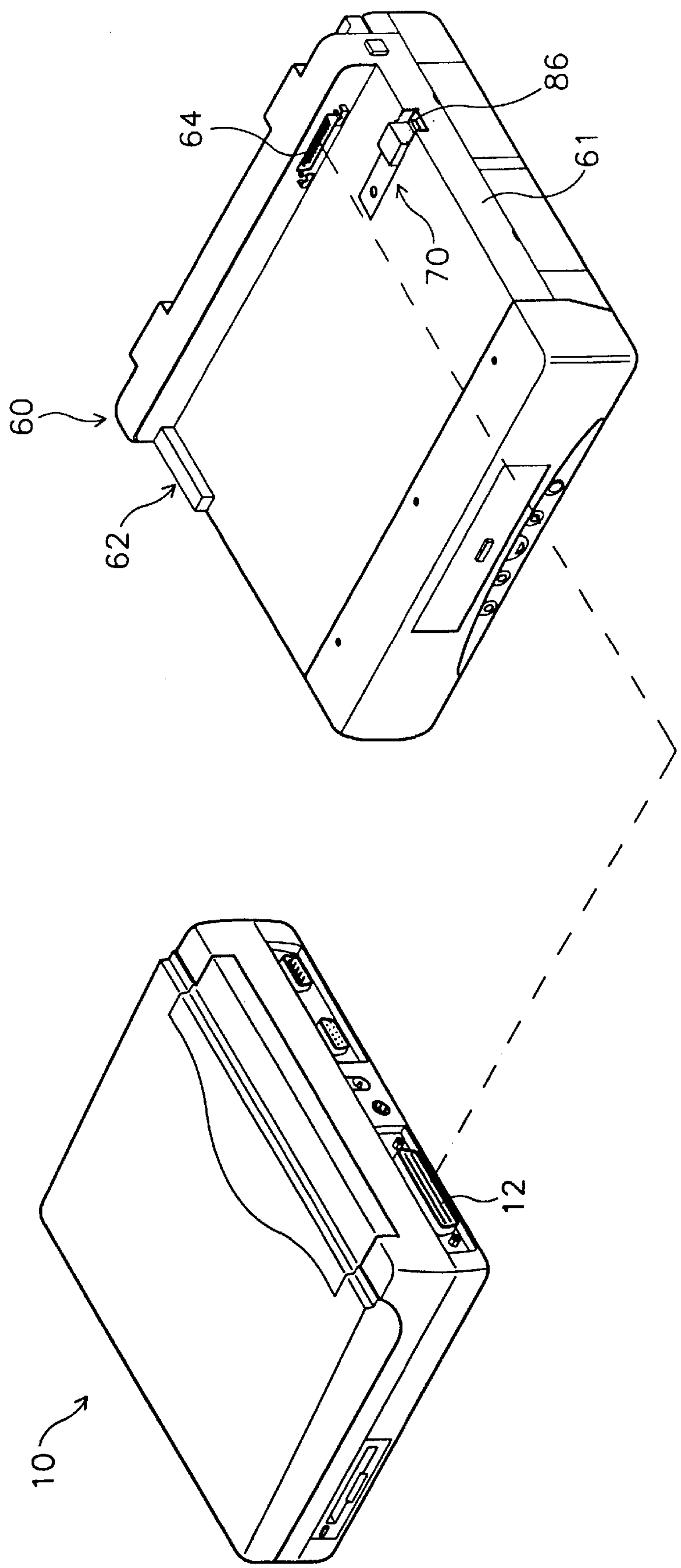
FIG. 9 is a perspective view of a docking station as constructed according to a second embodiment of the present invention illustrating a guide rail recessed into the tray portion of the docking station.

FIG. 9 is a perspective view showing a portable computer and a docking station as constructed according to a second embodiment of the present invention. Guide rail 70 is engaged with a seating surface that is recessed into the tray portion of chassis 61. Opposing guide rail 70 is fixed guide rail 62 that acts cooperatively with guide rail 70 to properly align portable computer port 12 with docking station port 64.

Figure 10:
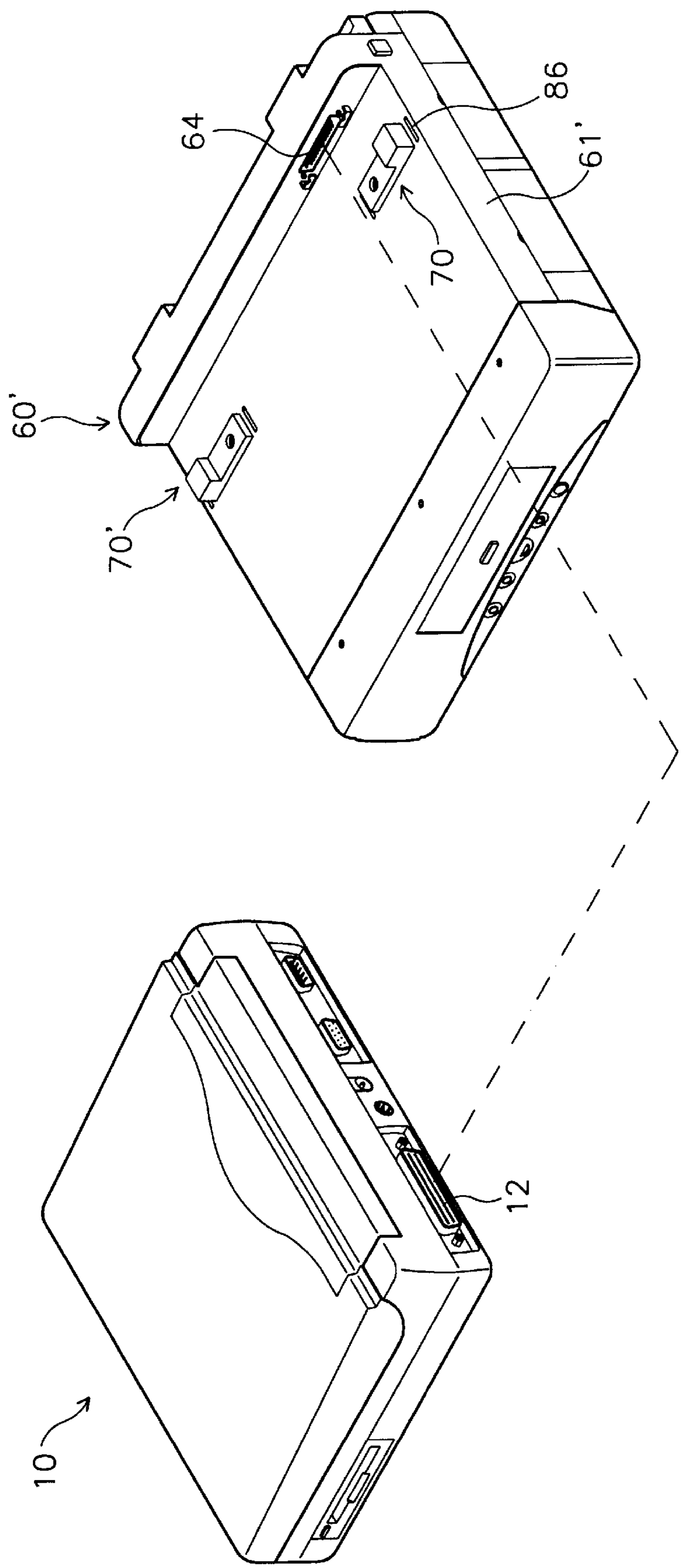
FIG. 10 is a perspective view of the docking station of FIG. 9 illustrating two guide rails attached to non-recessed seating areas on the tray portion of the docking station.

FIG. 10 is a perspective view illustrating a docking station the docking station of FIG. 9 with two opposing guide rails installed on each side of the tray portion of the docking station. In FIG. 9, docking station 60 is constructed with both guide rail 70 and fixed guide rail 62, that are located on both sides of the tray portion of docking station 60. In docking station 60, the width between guide rail 70 and fixed guide rail 62 can be adjusted to accommodate various types of portable computers irrespective of the sizes or port's positions of the computers. Docking station 60', as shown in FIG. 10, may be constructed with two guide rails 70 and 70', that are opposingly positioned on opposite sides of the tray portion of docking station 60'.

Figure 11:
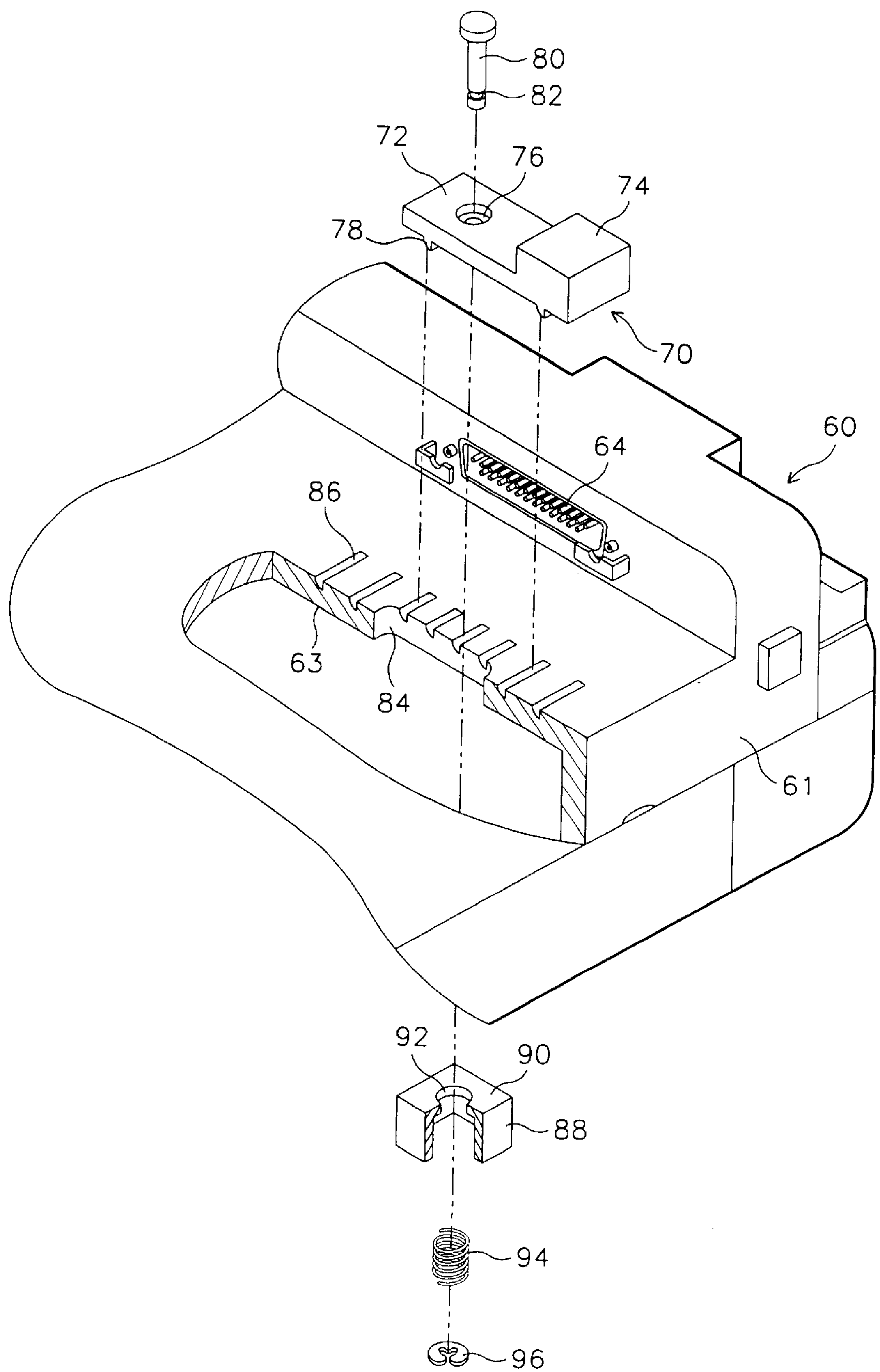
FIG. 11 is a partially cross-sectional perspective view of the docking station of FIG. 9, illustrating a guide rail separated from a non-recessed seating surface.

As shown in FIG. 11, the seating surface for a guide rail as constructed according to a second embodiment of the present invention has a seating surface formed on the top side of the tray portion of chassis 61. That is, groove 84 is formed on the top side of chassis 61 so that groove 84 extends in a direction perpendicular to the mounting direction of computer 10 on housing 61. Guide rail 70 is adjustable to accommodate various width and port locations for various types of portable computers. Guide rail 70 may be constructed using rectangular body 72, that can be mounted to the top side of chassis 61. Rectangular body 72 has flange 74 forming a guide rail to properly align a portable computer on the docking station.

Guide rail 70 also has stop ridges 78 that engage with slits 86 in the seating surface. The guide rail is also secured to the chassis via a fastener means. The fastener means may be constructed of body 88 that fastener 80 penetrates after passing through both guide rail 70 through opening 76 and the seating surface. A compressed spring is positioned over the end of fastener 80 and stop ring 96 is inserted into circumferential groove 82 in fastener 80 to secure spring 94 to fastener 80. The spring generates a force securing the guide rail to the seating surface on the chassis of the docking station by using a spring to generate the force to secure the guide rail to the chassis.

The fastener means is positioned inside chassis 61, comes into contact with inner surface 63 of chassis 61, and allows guide rail 70 to be secured with the top side of chassis 61. The fastener means uses body 88, secure spring 94, and stop ring 96. Body 88 is formed as a cap member having pin hole 92 in top wall 90 and is placed under the inner surface 63 of chassis 61 at a position around guide hole 84. The lower portion of fastener 80, passes through guide rail 70 and groove 84, and is inserted into body 88 through pin hole 92. Then, secure spring 94 is fitted over the lower portion of fastener 80 and secured in a compressed state by stop ring 96 that is attached over the lower end of fastener 80. Spring 94 normally biases fastener 80 in an engaged position against the top side of housing 61.

Additionally, guide rail 70 has stop ridges 78 that are transversely formed across the lower surface of body 72. To engage stop ridges 78 of guide rail 70 with the top side of chassis 61, slits 86 are located at regular intervals on the seating surface. Slits 86 individually extend in a direction perpendicular to the sliding direction of guide rail 70. Due to the stop ridges 78 and slits 86, it is easy to gradually and precisely move guide rail 70 into the appropriate position to accommodate a portable computer. Stop ridges 78 and slits 86 are designed allow guide rail 70 to be smoothly movable.

Figure 12:
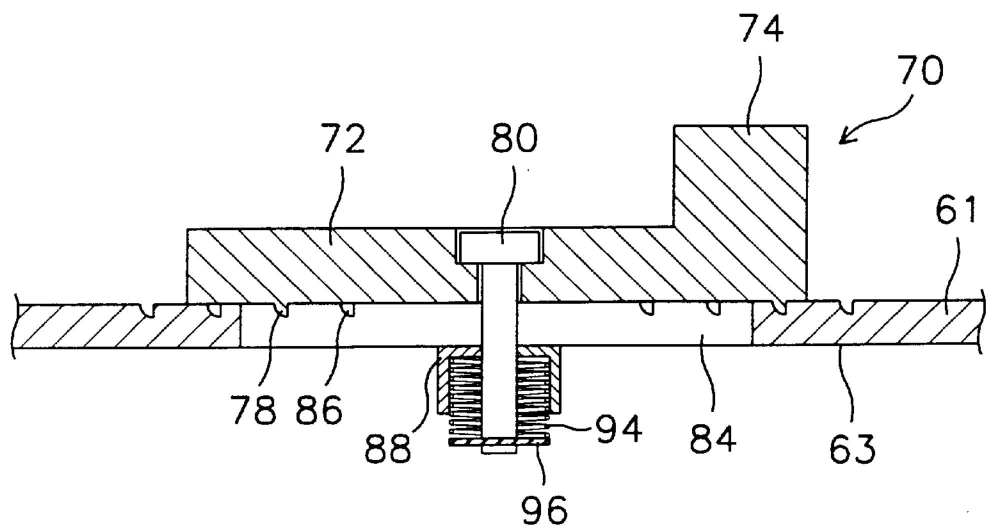
FIG. 12 is a cross-sectional view of the guide rail of FIG. 9.
Figure 13A:
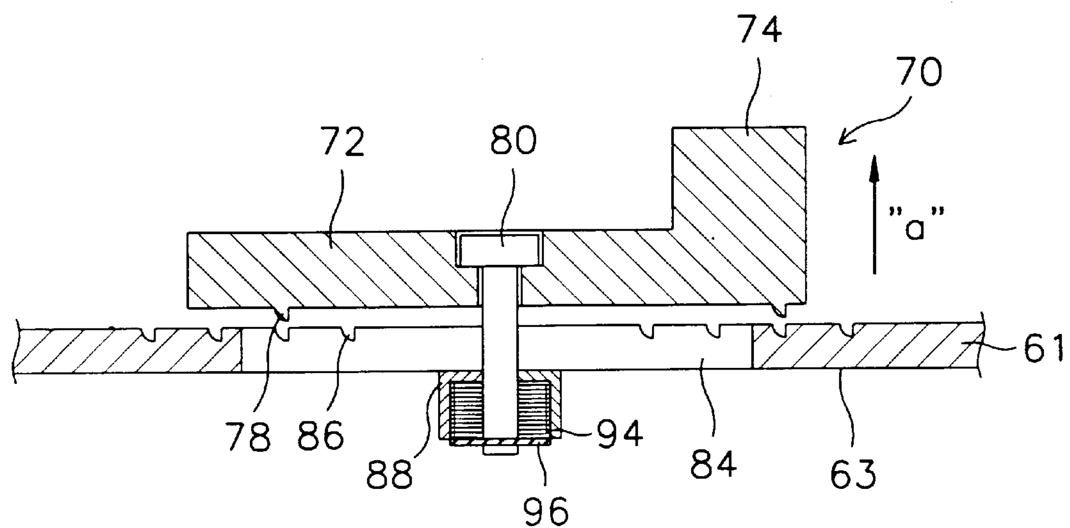
FIGS. 13A to 13C are cross-sectional views illustrating the operation of the guide rail of FIG. 9.
Figure 13B:
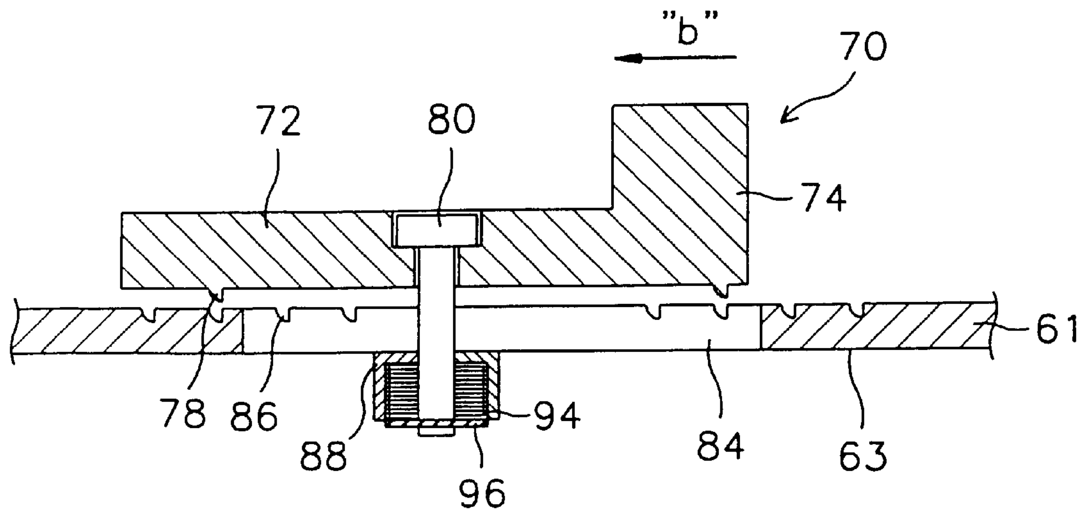
Figure 13C:
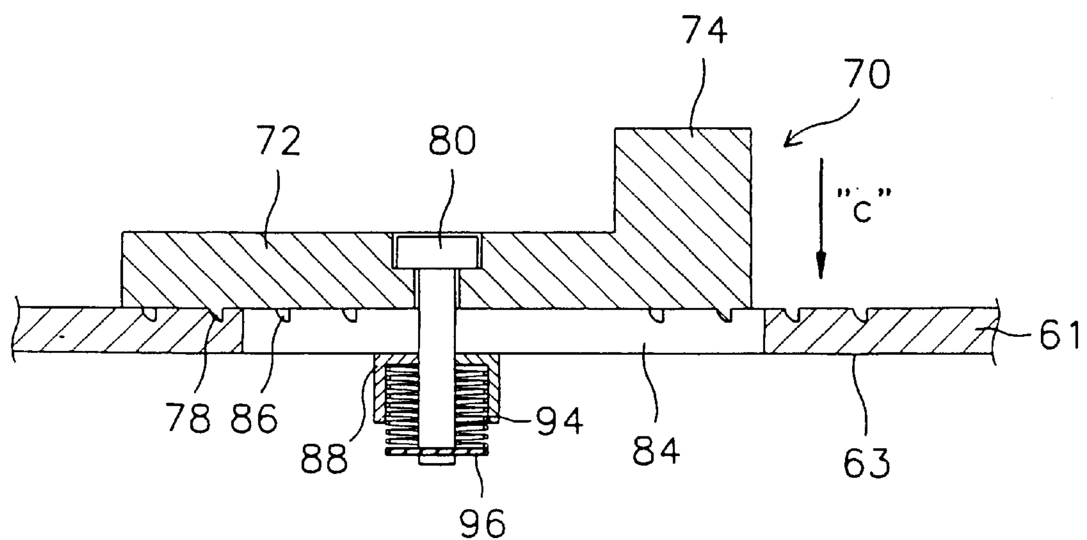

FIG. 12 illustrates a cross-sectional view of guide rail 70 taken along the sliding direction of guide rail 70. FIGS. 13A to 13C are cross-sectional views showing the operation of guide rail 70 during the operation of adjusting guide rail 70 to align a portable computer for interfacing with the docking station.

When it is necessary to move the guide rail 70 to the left in the drawing, a user pushes the guide wall 74 of the guide rail 70 to the left. In such a case, the guide rail of the second embodiment will be operated as follows.

When a user desires to readjust the width between the guide rails, guide rail 70 must be lifted up from its equilibrium position, as shown in FIG. 12. When the guide rail is lifted, stop ridges 78 disengage from slits 86 and the user can then slide the guide rail along the direction of groove 84. Guide rail 70 is shown in a disengaged state in FIG. 13A. The arrow denoted "a" shows the direction the guide rail must be displaced to disengage stop ridges 78 from slits 86. Disengaging the guide rail from the chassis further compresses spring 94. Then a user moves the guide rail in the direction of groove 84. Arrow "b" shows one direction that the guide rail can be moved in. The guide rail can also be moved in the '-b' direction. When guide rail 70 has been moved to a position desired by a user, a user releases the guide rail and it engages the chassis by moving in the direction of arrow 'c' due to force generated by spring 94.

The guiding device has stop ridges 78 and slits 86 that individually have a small size and are preferably designed to have a vertical surface at one side surface perpendicular to the sliding direction of the guide rail 70. It is more preferable to form the vertical surface at the outside surface of each of the stop ridges 78 and slits 96. The guide rail can be easily moved by pushing guide rail 70 inward because of the shape of the slits. However, to move the guide rail outward, the shape of the slits requires that the user disengage the guide rail from the chassis.

Figure 14:
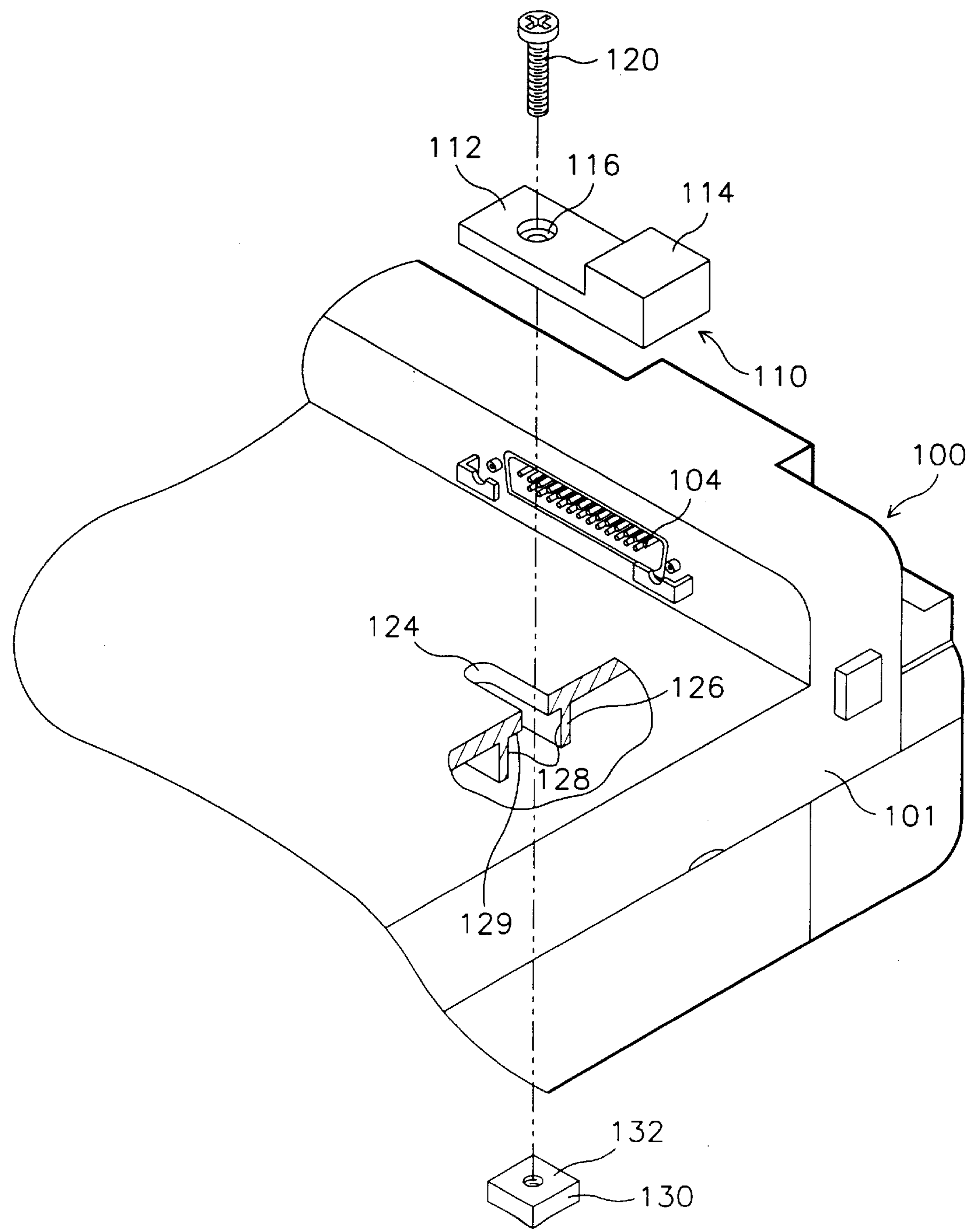
FIG. 14 is a partially cross-sectioned perspective view illustrating a guide rail as constructed according to the principles of the third embodiment of the present invention.

FIG. 14 is a partially cross-sectioned perspective view showing a docking station that has a guide rail constructed according to the third embodiment of the present invention, with a movable guide rail of the guiding device being separated from a guide rail seat formed on the docking station.

Figure 17:
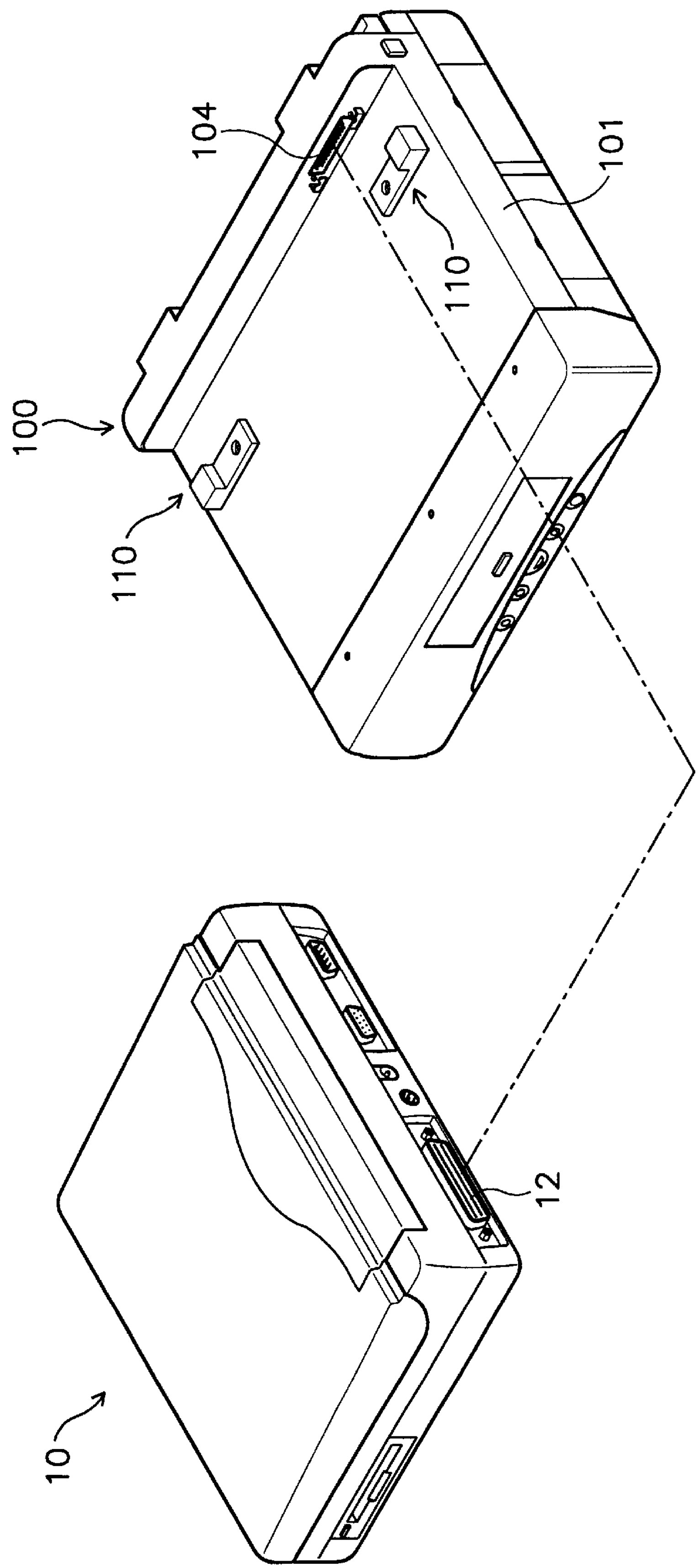
FIG. 17 illustrates a perspective view of the docking station of FIG. 14 illustrating two guide rails.

Docking station 100 has port 104 to interface with a computer port 12 of portable computer, 10 (FIG. 17) the docking station may be constructed using two guide rails 110 or one guide rail 110 and a fixed guide rail. FIG. 17 illustrates the docking station 100 of FIG. 14 having two guide rails 110. Guide rail 110 is coupled to the seating surface of chassis 101 using both a bolt or screw type fastener. To secure guide rail 110 to chassis 101 a fastener is used in conjunction with groove 124. Groove 124 extends in a direction perpendicular to the mounting direction of a computer onto chassis 101. Guide rail 110 may be constructed of rectangular body 112, that has flange 114 perpendicularly attached along an outside end.

Figure 15:
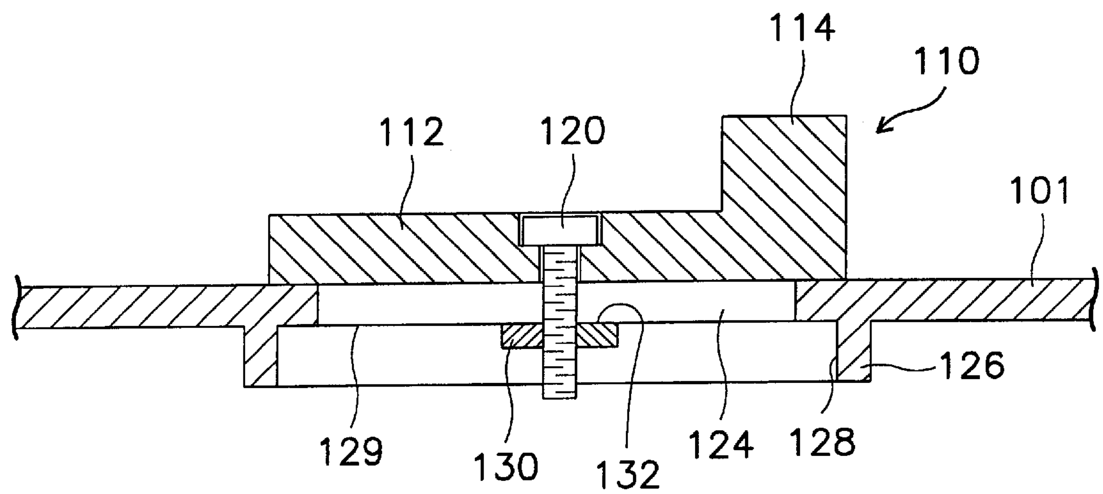
FIG. 15 is a cross-sectional view of the guide rail of FIG. 14 taken along a sliding direction of the guide rail.
Figure 16A:
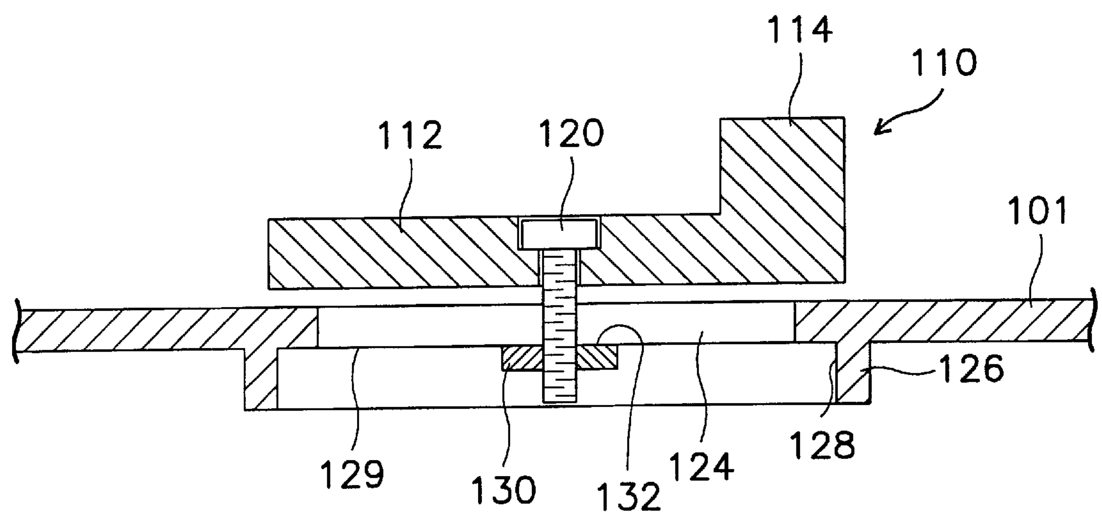
FIGS. 16A and 16B are cross-sectional views of the guide rail of FIG. 14, illustrating the operation of the guide rail during the adjustment process.
Figure 16B:
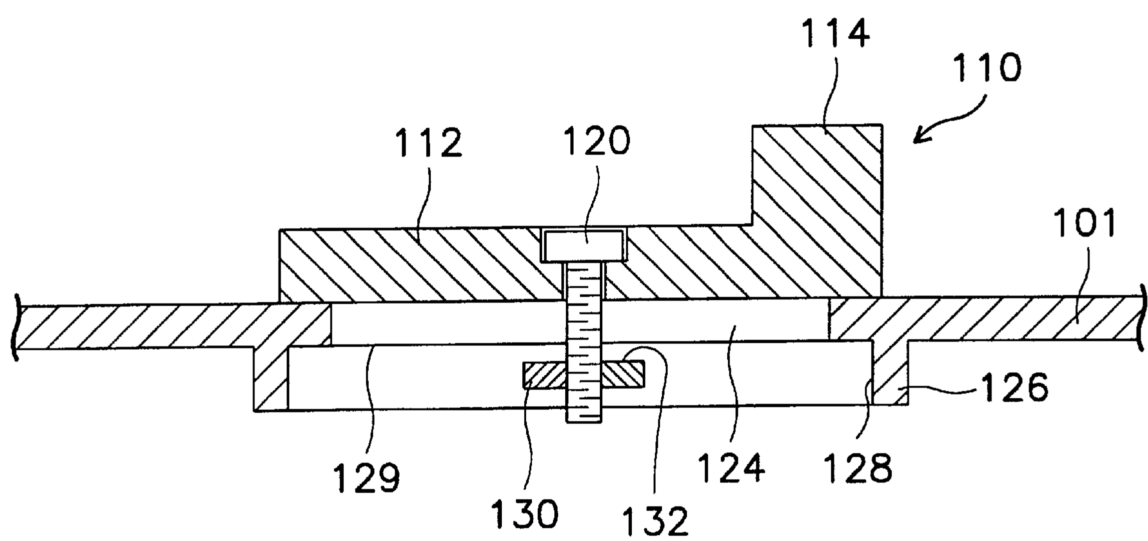

When a user wants to adjust guide rail 110, fastener 120 is manually loosened and then the guide rail is adjusted, as illustrated in FIGS. 16A and 16B. After the guide rail is in the appropriate fastener 120 it is tightened into nut 130 to secure the guide rail into place, as illustrated in FIG. 15.

Additionally, the chassis may have two parallel ribs 126 and a stop nut 130 as illustrated in FIGS. 15, 16A and 16B. The two parallel ridges 126 are provided on interior surface 129 of the chassis's top side, at opposite positions around the guide hole 124, that extend in a direction parallel to the sliding direction of the guide rail 110. The stop nut 130 engages with the external thread of the bolt 120 and has a rectangular configuration, so the nut 130 is guided by inside surfaces 128 of the two ridges 126.

The guide rail according to the third embodiment is advantageous in that it is possible to adjust the position of the movable guide rail 110 using a simple structure.

FIG. 15 is a cross-sectional view of the guide rail taken along the sliding direction of the movable guide rail 110. Bolt 120 engages with nut 130, that is guided by the two ribs 126 on the interior surface 129 of the chassis's top side, thus bringing the guide rail 110 into secure contact with the top side of the chassis. When bolt 120 is fully tightened to hold the position of guide rail 110 on chassis 101, top surface 132 of nut 130 is brought into contact with inner surface 129 of the chassis's top side. When bolt 120 is loosened, top surface 132 of nut 130 is separated from inner surface 129 of the chassis's top side.

As described above, the present invention provides a portable computer docking station provided with adjustable guide rails. The guiding device effectively guides various portable computers on the docking station irrespective of different widths or differently positioned computer ports. Thus, the present invention allows users to buy a docking station regardless of the types of portable computers that will be interfaced with the docking station. The present invention also allows a user to use an existing docking station when the user changes a currently used portable computer for a new one. The invention further allows computer manufacturers to disregard specifically designing docking stations every time a new portable computer is developed.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A docking station for a portable computer, said docking station comprising:

- a chassis comprising:
  - a structure having a front side bearing a port for interfacing with said portable computer, and bearing a plurality of peripheral ports for interfacing with a peripheral device;
  - a tray attached to said structure, having a top side, and extending from said front side of said structure to support said portable computer while said portable computer is interfaced with said chassis; and
  - a depression in a top side of said tray creating a seating surface;

said seating surface comprising:

- a first groove located in a bottom of said seating surface; and
- a second groove located in said bottom of said seating surface substantially parallel to said first groove;
- a plurality of guide means respectively disposed on opposite sides of said tray for guiding said portable computer on said tray at least one of said guide means comprising a guide rail slidably insertable inside said depression in said tray and engageable with said seating surface, said guide rail comprising:
  - a body having a base and a first flange for guiding said portable computer along said tray of said chassis during the interfacing of said portable computer with said chassis;
  - a plug attached to said base for engaging said second groove; and
  - a pair of opposing latches attached to said base for engaging said first groove;
- a second flange attached to said top side of said chassis as another of said plurality of guide means forming a fixed guide rail operating cooperatively with said guide rail to properly align a portable computer while interfacing said portable computer with said docking station.

2. The docking station of claim 1, further comprised of said body of said guide rail having a rectangular shape that combines with said first flange to form an L-shaped member.

3. The docking station of claim 1, further comprising said second groove having a plurality of necked regions along said second groove.

4. A docking station for a portable computer, said docking station comprising:

- a chassis comprising:
  - a structure having a front side bearing a port for interfacing with said portable computer, and bearing a plurality of peripheral ports for interfacing with a peripheral device;
  - a tray attached to said structure, having a top side, and extending from said front side of said structure to support said portable computer while said portable computer is interfaced with said chassis; and
  - a plurality of depressions in a top side of said tray each creating a seating surface;

said seating surface comprising:

- a first groove located in a bottom of said seating surface; and
- a second groove located in said bottom of said seating surface substantially parallel to said first groove;
- a plurality of guide rails each respectively slidably insertable inside a corresponding one of said plurality of depressions in said tray and engageable with a corresponding said seating surface, each of said plurality of guide rails comprising:
  - a body having a base and a flange for guiding said portable computer along said tray of said chassis during the interfacing of said portable computer with said chassis;
- a plug attached to said base for engaging said second groove; and a pair of opposing latches attached to said base for engaging said first groove;

each said flange from each of said plurality of guide rails operating cooperatively to properly align said portable computer while interfacing said portable computer with said docking station.

5. The docking station of claim 4, further comprised of said body of each of said plurality of guide rails having a rectangular shape that combines with said flange to form an L-shaped member.

6. The docking station of claim 5, further comprising said second groove having a plurality of necked regions along said second groove.

7. A docking station for a portable computer, said docking station comprising:

a chassis comprising:

a structure having a front side bearing a port for interfacing with said portable computer, and bearing a plurality of peripheral ports for interfacing with a peripheral device;

a tray attached to said structure, having a top side, and extending from said front side of said structure to support said portable computer while said portable computer is interfaced with said chassis; and a depression in a top side of said tray creating a seating surface; said seating surface comprising:

a groove located in a bottom of said seating surface; and a plurality of slits located in a bottom of said seating surface;

a plurality of guide means respectively disposed on opposite sides of said tray for guiding said portable computer on said tray, one of said plurality of guide means comprising a guide rail slidably insertable inside said depression in said tray and engageable with said seating surface, said guide rail comprising:

a body having a base and a top side;

a first flange for guiding said portable computer along said tray of said chassis during the interfacing of said portable computer with said chassis;

a counterbored hollow; and a pair of ribs attached to said base for engaging said slits in said seating surface;

a fastener means for securing said guide rail to said seating surface; and a second flange attached to said top side of said chassis as another of said plurality of guide means forming a fixed guide rail operating cooperatively with said guide rail to properly align said portable computer while interfacing said portable computer with said docking station.

8. The docking station of claim 7, further comprised of said body of said guide rail having a rectangular shape that combines with said first flange to form an L-shaped member.

9. The docking station of claim 7, with said fastener means further comprising:

a fastener inserted through said counterbored hollow in said guide rail and through said groove in said seating surface;

a spring biased member attached to an end of said fastener that protrudes past said groove in said seating surface; and said spring biased member exerting a force securing said guide rail to said seating surface.

10. The docking station of claim 9, with said spring biasing member comprising:

a rectangular shaped body;

a bore penetrated by said end of said fastener; and a spring contained in said rectangular shaped body and biasing said fastener towards said base of said body.

11. A docking station for a portable computer, said docking station comprising:

a chassis comprising:

a structure having a front side bearing a port for interfacing with said portable computer, and bearing a plurality of peripheral ports for interfacing with a peripheral device;

a tray attached to said structure, having a top side, and extending from said front side of said structure to support said portable computer while said portable computer is interfaced with said chassis; and a plurality of seating surfaces positioned on said top side of said tray, each of said plurality of seating surfaces comprising:

a groove; and a plurality of slits oriented substantially perpendicularly to said groove;

a plurality of guide rails each slidably engageable with a corresponding one of said plurality of seating surfaces, each of said plurality of guide rails comprising:

a body having a base and a top side;

a flange for guiding said portable computer along said tray of said chassis during the interfacing of said portable computer with said chassis;

a counterbored hollow; and a pair of ribs attached to said base for engaging corresponding ones of said plurality of slits in a corresponding one of said plurality of seating surfaces;

each said flange from each of said plurality of guide rails operating cooperatively to properly align said portable computer while interfacing said portable computer with said docking station.

12. The docking station of claim 11, further comprised of said body having a rectangular shape that combines with a corresponding said flange to form an L-shaped member.

13. The docking station of claim 11, further comprising:

a fastener respectively inserted through said counterbored hollow and through said groove in a corresponding one of said plurality of seating surfaces;

a spring biased member attached to an end of said fastener that protrudes past said groove in a corresponding one of said plurality of seating surfaces; and said spring biased member exerting a force securing a corresponding one of said plurality of guide rails to a corresponding one of said plurality of seating surfaces.

14. The docking station of claim 13, with said spring biasing member comprising:

a rectangular shaped body;

a bore penetrated by said end of said fastener; and a spring contained in said rectangular shaped body and biasing said fastener towards a base of a corresponding said body.

15. A docking station for a portable computer, said docking station comprising:

a chassis comprising:

a structure having a front side bearing a port for interfacing with said portable computer, and bearing a plurality of peripheral ports for interfacing with a peripheral device;

a tray attached to said structure, having a top side, and extending from said front side of said structure to support said portable computer while said portable computer is interfaced with said chassis; and a plurality of seating surfaces positioned on said top side of said tray;

each of said plurality of seating surfaces comprising a groove;

a plurality of guide rails each slidably engageable with a corresponding of one said plurality of seating surfaces, each of said plurality of guide rails comprising:

a body having a base and a top side;

a flange for guiding said portable computer along said tray of said chassis during the interfacing of said portable computer with said chassis; and a counterbored hollow for fastenably engaging a corresponding one of said plurality of said guide rails to said chassis;

each said flange from each of said plurality of guide rails operating cooperatively to properly align said portable computer while interfacing said portable computer with said docking station.

16. The docking station of claim 15, further comprised of said body having a rectangular shape that combines with a corresponding said flange to form an L-shaped member.

17. The docking station of claim 15, further comprising a pair of opposing ridges attached to an inner surface of said chassis along two sides of a corresponding said groove in a corresponding one of said plurality of seating surfaces.

18. A docking station for a portable computer, comprising:

a housing for supporting said portable computer on a top side of said housing;

a port provided on said housing for electrically interfacing with said portable computer; and a plurality of guide means for guiding said portable computer along said top side of said housing when said portable computer is being engaged with said docking station, said plurality of guide means being respectively disposed on opposite sides of said top side of said housing, at least one of said plurality of guide means being slidably attached to said docking station.

19. The docking station of claim 18, with said housing comprising:

a structure having a front side, bearing said port;

a tray attached to said structure, having a top side, and extending from said front side of said structure to support said portable computer while said portable computer is interfaced with said housing; and a depression in said top side of said tray creating a seating surface to receive one of said plurality of guide means.

20. The docking station of claim 19, with said seating surface further comprising:

a bottom of said seating surface bearing a first groove; and said bottom of said seating surface bearing a second groove substantially parallel to said first groove.

21. The docking station of claim 20, with a guide rail functioning as one of said plurality of guide means, said guide rail further comprising:

a body having a base and a first flange for guiding said portable computer along said tray of said housing during the interfacing of said portable computer with said housing;

a plug attached to said base for engaging said second groove; and a pair of opposing latches attached to said base for engaging said first groove.

22. The docking station of claim 21, further comprised of said body of said guide rail having a rectangular shape.

23. The docking station of claim 21, further comprising said second groove having a plurality of necked regions along said second groove.

24. The docking station of claim 18, with said housing further comprising:

a structure having a front side bearing said port;

a tray attached to said structure, having a top side, and extending from said front side of said structure to support said portable computer while said portable computer is interfaced with said housing; and a plurality of depressions in a top side of said tray each creating a corresponding seating surface to respectively receive one of said plurality of guide means.

25. The docking station of claim 24, with each said seating surface further comprising:

a bottom of said seating surface bearing a first groove; and said bottom of said seating surface bearing a second groove substantially parallel to said first groove.

26. The docking station of claim 25, with said plurality of guide means comprising two guide rails, each one of said two guide rails being engaged with a separate corresponding seating surface in said tray and each comprising:

a body having a base and a first flange for guiding said portable computer along said tray of said housing during the interfacing of said portable computer with said housing;

a plug attached to said base for engaging said second groove; and a pair of opposing latches attached to said base for engaging said first groove.

27. The docking station of claim 26, further comprising each of said two guide rails having a rectangular shape.

28. The docking station of claim 25, further comprising said second groove having a plurality of necked regions along said second groove.

29. The docking station of claim 18, with said housing further comprising:

a structure having a front side bearing said port;

a tray attached to said structure, having a top side, and extending from said front side of said structure to support said portable computer while said portable computer is interfaced with said housing;

a depression in a top side of said tray creating a corresponding seating surface to receive one of said plurality of guide means;

a bottom of said seating surface bearing a groove;

said bottom of said seating surface bearing a plurality of slits;

a guide rail as one of said plurality of guide means slidably insertable inside said depression in said tray and engageable with said seating surface, said guide rail comprising:

a body having a base and a top side;

a first flange for guiding said portable computer along said tray of said housing during the interfacing of said portable computer with said housing;

said body bearing a counterbored hollow; and a pair of ribs attached to said base for engaging said slits in said seating surface;

a fastener means for securing said guide rail to said seating surface; and a second flange attached to said top side of said housing forming a fixed guide rail operating cooperatively with said guide rail to properly align said portable computer while interfacing said portable computer with said docking station, said fixed guide rail being another of said plurality of guide means.

30. The docking station of claim 29, further comprised of said body of said guide rail having a rectangular shape.

31. The docking station of claim 29, with said fastener means further comprising:

a fastener inserted through said counterbored hollow in said guide rail and through said groove in said seating surface;

a spring biased member attached to an end of said fastener that protrudes past said groove in said seating surface; and said spring biased member exerting a force securing said guide rail to said seating surface.

32. The docking station of claim 18, with said housing further comprising:

a structure having a front side bearing said port;

a tray attached to said structure, having a top side, and extending from said front side of said structure to support said portable computer while said portable computer is interfaced with said housing; and a seating surface on a top side of said tray, said seating surface to respectively engage with a corresponding one of said plurality of guide means.

33. The docking station of claim 32, further comprising:

said seating surface bearing a groove;

said seating surface bearing said groove also bearing a plurality of slits oriented substantially perpendicularly to said groove; and a guide rail as one of said plurality of guide means respectively slidably insertable into a corresponding said seating surface on said tray, said guide rail comprising:

a body having a base and a top side;

a first flange for guiding said portable computer along said tray of said housing during the interfacing of said portable computer with said housing;

said body bearing a counterbored hollow; and a pair of ribs attached to said base for engaging corresponding ones of said slits in said seating surface.

34. The docking station of claim 33, further comprised of said body of said guide rail having a rectangular shape.

35. The docking station of claim 33, further comprising:

a fastener means for securing said guide rail respectively to a corresponding said seating surface bearing said groove; and a second flange as another of said plurality of guide means attached to said top side of said housing operating cooperatively with said guide rail to properly align said portable computer while interfacing said portable computer with said docking station.

36. The docking station of claim 35, with said fastener means further comprising:

a fastener inserted through said counterbored hollow in a corresponding said guide rail and through a corresponding said groove in a corresponding said seating surface;

a spring biased member attached to an end of said fastener that protrudes past said groove in said seating surface; and said spring biased member exerting a force securing a corresponding said guide rail to a corresponding said seating surface.

37. The docking station of claim 18, further comprising:

a groove in said top side of said housing;

two guide rails comprising said plurality of guide means, each comprising:

a body having a base and a top side;

a flange for guiding said portable computer along said tray of said housing during the interfacing of said portable computer with said housing; and said body bearing a counterbored hollow.

38. The docking station of claim 37, further comprised of said body having a rectangular shape.

39. The docking station of claim 37, further comprising a pair of opposing ridges attached to an inner surface of said housing along two sides of a corresponding said groove in said top side of said housing.

* * * * *